(No Model.)
J. F. BOMAN & J. CORNELIUS.
HOG TRAP.
No. 497,163. Patented May 9, 1893.
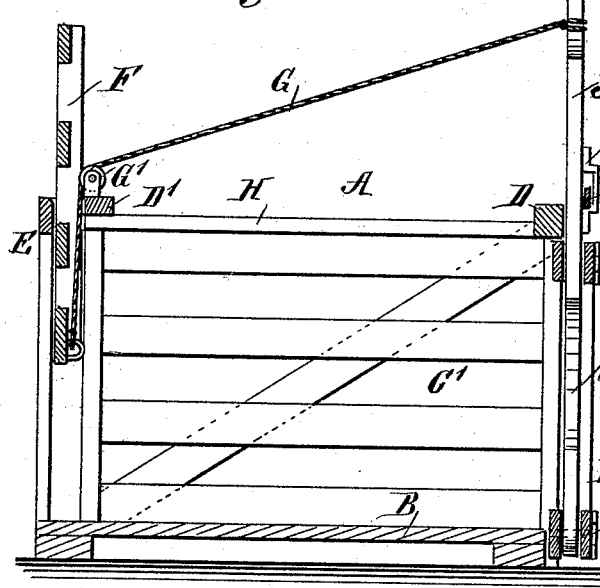
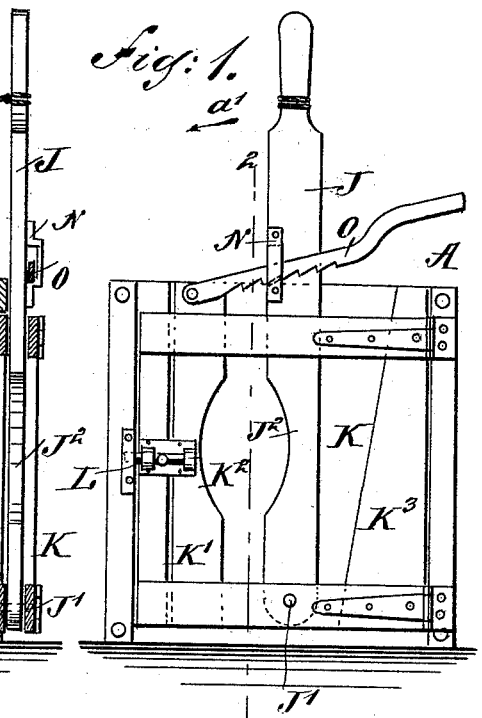
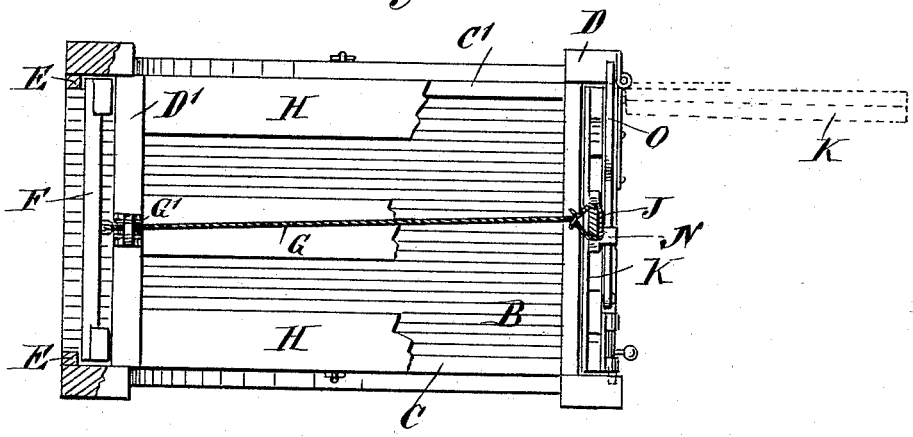
WITNESSES:
Chas. Nida.
C. Sedgwick
INVENTORS:
J. F. Boman
J. Cornelius
By Munn & Co
ATTORNEYS.

UNITED STATES PATENT OFFICE.

JAMES FRANKLIN BOMAN AND JOHN CORNELIUS, OF FLAT ROCK, INDIANA.

HOG-TRAP.

SPECIFICATION forming part of Letters Patent No. 497,163, dated May 9, 1893.

Application filed October 1, 1892. Serial No. 447,528. (No model.)

*To all whom it may concern:*

Be it known that we, JAMES FRANKLIN BOMAN and JOHN CORNELIUS, both of Flat Rock, in the county of Shelby and State of Indiana, have invented a new and Improved Hog Trap and Crate, of which the following is a full, clear, and exact description.

The object of the invention is to provide a new and improved combined hog trap and shipping crate, which is simple and durable in construction, and arranged to conveniently trap the hog and transport it, the trap forming the shipping crate.

The invention consists of a crate provided at its rear end with a sliding door, and at its front end with a hinged door provided with an opening, and a lever for holding the animal's head in the opening.

The invention also consists of certain parts and details, and combinations of the same, as will be fully described hereinafter and then pointed out in the claim.

Reference is to be had to the accompanying drawings forming a part of this specification, in which similar letters of reference indicate corresponding parts in all the figures.

Figure 1 is a front view of the improvement. Fig. 2 is a sectional side elevation of the same on the line 2—2 of Fig. 1; and Fig. 3 is a plan view of the same with parts broken out and parts in section.

The improvement is provided with a crate A having a slide bottom B, and the open sides C, C′, made of slats or otherwise constructed, the sides being connected with each other at the front and rear ends by suitable cross bars D and D′. On the rear end of the crate A are arranged guideways E for a door F mounted to slide vertically in said guideways to open and close the rear end of the crate.

Near the lower end of the door F and at the middle thereof, is secured one end of a rope G which extends upward and passes over a pulley G′ supported on the cross bar D′, the said rope extending from the pulley over the slatted top H of the crate to be secured to a lever J fulcrumed at J′ on a door K hinged to the front end of the crate A to close the same at this end. A bolt L serves to lock the door K.

On one of the vertical boards K′ of the door K is formed a recess $K^2$, and a similar recess $J^2$ is formed in one side of the lever J which, when swung sidewise toward the board K′, serves to diminish the opening formed by the recesses $K^2$ and $J^2$, and when the lever is swung rearward, the said opening is increased. On the lever J is secured a keeper N engaged by a toothed arm O fulcrumed on the door K at the upper end of the board K′. The slat or board $K^3$ of the door K is inclined at its inner edge, so as to form a resting place for the lever J when the latter is swung in a rearmost position for a full opening of the variable door opening, as above described.

The device is used as follows: When it is desired to trap the hog or other animal, the sliding door F is raised so that the rear end of the crate A is opened, the front door K being closed and locked in place by the sliding bolt L. The hog is now driven into the open rear end of the crate and when the animal has passed into the latter the door F is lowered by unfastening the rope G from the lever J. The animal is thus trapped. In order to put a ring in the animal's mouth, the animal is pushed forward, so that its head passes out through the opening formed by the recesses $J^2$ and $K^2$, and then the operator draws the lever J in the direction of the arrow $a'$ so that the animal's neck is caught between the board K′ and the lever J. The lever is locked in the downward position by the toothed arm O engaging the keeper N of the said lever. As the animal's head is now firmly clamped in position, the operator can readily insert the ring in its snout. When the animal is caged or trapped, the crate A with the animal therein can be transmitted to any desired place, the trap then forming a shipping crate. When it is desired to release or let the animal out, the arm O, is raised, the lever J is swung rearward in the direction of the arrow $a'$, so as to release the animal's neck, the animal drawing its head back into the crate, and when the door K is now opened the animal can pass out of the crate.

Having thus fully described our invention, we claim as new and desire to secure by Letters Patent—

In a device of the class described, the combination with a crate provided at its rear end with guideways, of a sliding door mounted to slide in the guideways at the rear end of the crate, a horizontally swinging hinged door at the front end of the crate, a lever pivoted on said hinged door and provided with a recess in one edge opposite a corresponding recess in a board of the said hinged door, a keeper on the said lever, and a toothed arm pivoted on the said hinged door and extending through the said keeper, substantially as shown and described.

JAMES FRANKLIN BOMAN.
JOHN CORNELIUS.

Witnesses:
CHAS. E. McCARTNEY,
W. NADING.